United States Patent
Memmesheimer

[19]

[11] Patent Number: 5,986,213
[45] Date of Patent: Nov. 16, 1999

[54] DEVICE FOR CLOSING AND SEALING OF CUTOUTS FOR CABLE BUSHINGS FOR CABLES WITH PREMOUNTED PLUGS

[75] Inventor: Günther Memmesheimer, Dinslaken, Germany

[73] Assignee: Rolec Enclosures USA Inc., Vero Beach, Fla.

[21] Appl. No.: 08/916,307

[22] Filed: Aug. 22, 1997

[30] Foreign Application Priority Data

Mar. 6, 1997 [DE] Germany ............................ 197 09 558

[51] Int. Cl.⁶ .................................................. H02G 15/02
[52] U.S. Cl. ...................................... 174/74 R; 174/77 R
[58] Field of Search ............................... 174/74 R, 75 B, 174/77 R, 92, 65 R, 151, 48, 52.1, 53; 248/56; 439/535

[56] References Cited

U.S. PATENT DOCUMENTS

| | | | |
|---|---|---|---|
| 3,483,309 | 12/1969 | Kerseg et al. | 174/65 R |
| 5,155,300 | 10/1992 | Brandner | 174/65 R |
| 5,245,131 | 9/1993 | Golden et al. | 174/65 R |
| 5,408,740 | 4/1995 | Dee | 174/65 R X |
| 5,693,908 | 12/1997 | Amberger | 174/48 |

FOREIGN PATENT DOCUMENTS 2720936  11/1978  Germany.
4020180   7/1991  Germany.

*Primary Examiner*—Kristine Kincaid
*Assistant Examiner*—Chau N. Nguyen
*Attorney, Agent, or Firm*—Dennis L. Cook

[57] ABSTRACT

A device is disclosed for closing and sealing of cable cutout bushings of major diameters, generally of a rectangular shape, as they are usually provided for leading through electrical cables with premounted plugs that can be used at interfaces of control enclosures or prefabricated walls and bracket systems in coupling or connecting elements as well as for switching cabinets and enclosures for the closing and sealing of major cable bushings. The device is molded mainly out of elastic material in which three functional elements are connected together to form one piece which combines three functional elements together, namely, (a) a sealing flange, (b) a conduit as connection part and (c) a cable sealing element. There is a middle part which in its inside forms a conduit of rectangular cross section with an inner diameter suitable to let serial plugs and a relevant number of cables pass through and an expandable cable sealing element is connected in one piece with a sealing flange which by a simple receptacle, an enclosure, or the connecting element of the bracket is pressed to the surface surrounding the cutout.

8 Claims, 6 Drawing Sheets

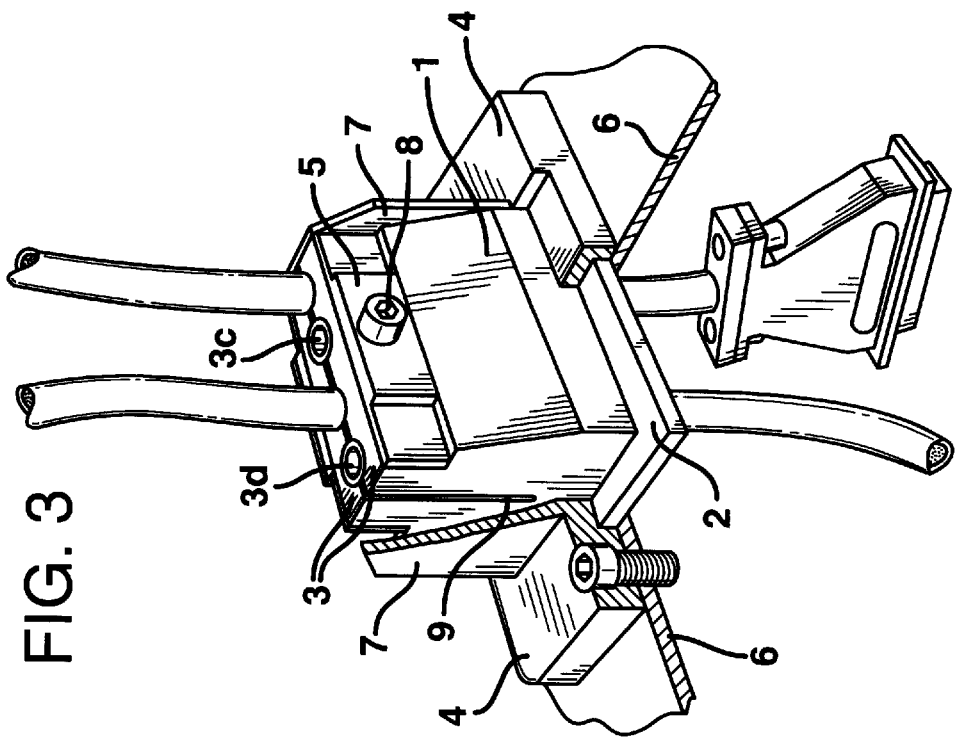
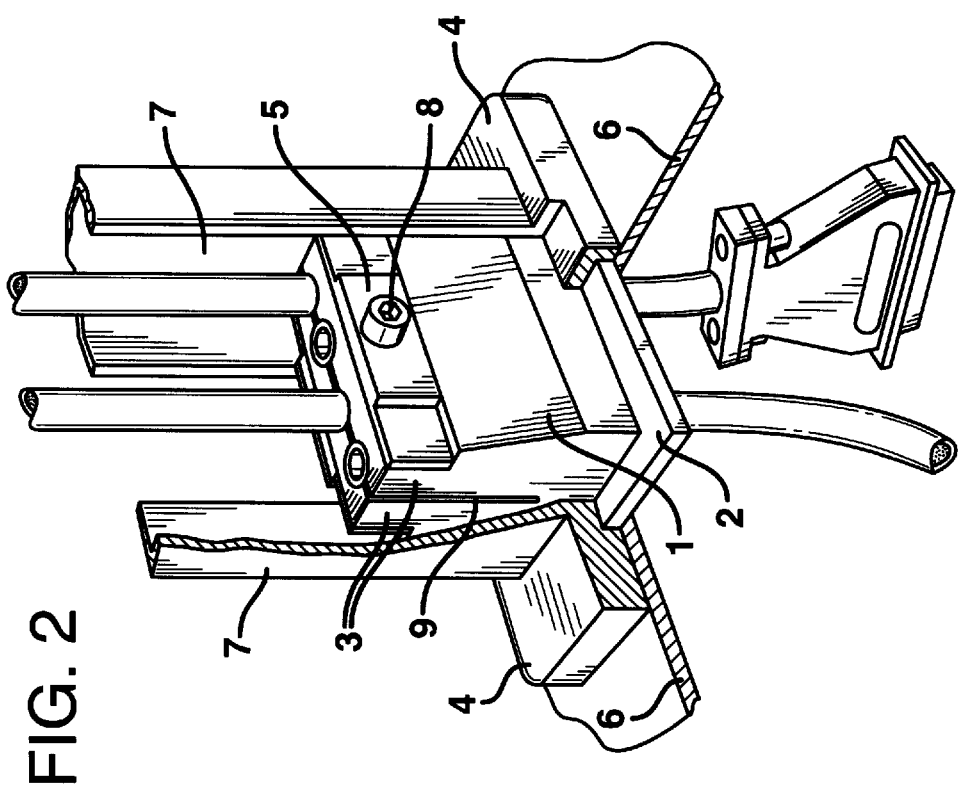

DEVICE FOR CLOSING AND SEALING OF CUTOUTS FOR CABLE BUSHINGS FOR CABLES WITH PREMOUNTED PLUGS

BACKGROUND OF THE INVENTION

1. Field of the Invention

The invention refers to a device for the closing and sealing of cable cutout bushings of major diameters, generally of a rectangular shape, as they are usually provided for leading through electrical cables with premounted plugs. The device can be used at interfaces of control enclosures or prefabricated walls and bracket systems in coupling or connecting elements as well as for switching cabinets and enclosures for the closing and sealing of major cable bushings.

2. Description of the Prior Art

In the installation of electrical wires, cables or the like (cables), it is typically necessary to close and form a seal around large cross-section wall openings, generally rectangular in shape, through which cables pass. Frequently, the cables being lead through have plugs already fitted to them.

As the cross-sectional width of the wall openings has to be at least large enough for the plug connectors to pass through, it is usually many times larger than the cross-section of the cables. If a number of cables pass through the same opening, it must be large enough not only for the plug connectors, but also for the relevant number of cables. If such cable access openings are then to be closed over and sealed, devices will be required which hermetically bridge the difference in size between the relatively large opening and the smaller cross-section of the cables, and also form a seal around the rim of the wall opening as well as around the cables.

Devices of this kind display a two-part enclosure divided along the length of the cable opening, such as those shown in German patents DE-OS 27 20 936, DE-GM 89 13 829, and DE 40 20 180 C1. The two parts of the enclosure are fitted to the cables from both sides and are thus joined together enclosing the cables, with a seat attached between the two parts of the enclosure, with foam-rubber sealing rings to form a seal against the cables. The latter, in the nature of things, can only apply a weak sealing pressure, so that it is necessary to provide additional anchorages for the cable inside the enclosure.

Once the enclosure shells have been joined together to form an enclosure around the cables, the cables, already fed through the cable opening to a sufficient length together with their plugs, are passed through the cable opening into the enclosure or into a control cabinet. Only then, are the cables connected to the enclosure for the purpose of covering the cable opening with the enclosure or control cabinet wall. If additional cables are led through the opening later, or if cables have to be replaced, the whole device has to be released from the enclosure or control cabinet wall and the two enclosure halves taken apart. In order to allow cables to be attached to and released from the wall more quickly than is possible with direct screw connections, a device described in DE-GM 89 13 829 possesses a frame element permanently mounted around the opening and representing a mounting for the two-piece enclosure. The holding frame and the enclosure can be easily released with the aid of swivelling or tension bars fastened to the frame and connected to the enclosure with pins. Although such device can be fixed to and removed from the frame quickly in this way, the frame represents additional cost and installation effort and this improvement does nothing to change the difficulties caused by the fact that the enclosure consists of two parts and the installation has to be made in a disadvantageous sequence.

The device described in DE 40 20 180 C1 is characterized by a reduction of the effort required to connect it to the wall. It is fastened by means of a leaf-spring element inserted into the rear side which reaches in through specially shaped protrusions and holds on to the inside of the wall. However, in this case there is still a two-part device which has to be mounted in advance around the cable with the same cost and installation effort as described above.

The problem which the present invention is intended to solve is to create a device of the general prior art kind which displays a similar construction to the familiar devices for leading cables through an opening and creating a seal around them, but for cables without plugs already mounted on them and with equally simple installation characteristics. In other words, a device to solve the problem must be able to be mounted on the enclosure wall, must be filled with a simple opening through which plugs and cables can be passed, and must afterwards create a seal around the cables, thus allowing for the later insertion of additional cables and the replacement and repositioning of cables without the device having to be dismantled. Such needed device should also be capable of being used at all points where the cable opening has to provide a seal around cables with premounted plugs.

OBJECTS

A principal object of the invention is the provision of new, improved devices for closing and sealing of cable cutout bushings of major diameters, generally of a rectangular shape, as they are usually provided for leading through electrical cables with premounted plugs.

A further object is the provision of such sealing devices that cover the cable opening and are mounted in such a way as to form a seal before the plugs and cables are passed through.

Another object is the provision of such sealing devices that cables with their plugs can be positioned in any convenient arrangement, further cables can be added, and any cable can be replaced without the device having to be released.

Yet another object is the provision of such sealing devices wherein cables are sealed and secured simply by closing a cable-sealing part with the splayed openings and tightening a clamp to create the pressure for sealing and clamping, or tightening three screws for the cover in the case of the enclosure-type version.

SUMMARY OF THE INVENTION

The objects are accomplished in accordance with the invention by moulding the new cable sealing device mainly out of elastic material in which three functional elements are connected together to form one piece which combines three functional elements together, namely, (a) a sealing flange, (b) a conduit as connection part and (c) a cable sealing element.

There is a middle part which in its inside forms a conduit of rectangular cross section with an inner diameter suitable to let serial plugs and a relevant number of cables pass through and expandable cable sealing element is connected in one piece with a sealing flange which by a simple receptacle, an enclosure, or the connecting element of the bracket is pressed to the surface surrounding the cutout.

The cable sealing part is expanded for letting cables and plugs pass through and is then closed after connecting the plugs and positioning the cables and is the pressed around the cables by means of a clamp so that, in addition to the sealing pressure, also a sufficiently high degree of clamping force is obtained for taking the tension forces off the cable.

The new sealing devices of the invention can be used everywhere where cable openings with a large cross-sectional size and cables with plugs ready mounted on them have to be covered and sealed. It bridges the difference in the cross-sectional dimensions between the opening and the cross-section of the cables hermetically and with a device made from a single piece.

The new devices can be fitted to many different mounting elements or enclosures, e.g., in the terminal elements of carrier-arm systems where they form a seal between the enclosure or wall edge and the carrier arm in such a way that the length of the carrier arm is no longer required to meet any strict sealing demands. This is also advantageous on account of the wide variety to be found in carrier arm elements.

With the aid of simple mounting devices such as flange-like frames or enclosures, it can be used for the outward sealing of cable openings in control cabinets. Its main ergonomic advantage is that it is mounted permanently in front of the cable opening. The cables are led through the device one by one, so the aperture space is designed for one plug at a time and the cable already inserted and lying in the seal aperture. When the device has been mounted, it remains open long enough and the cables can still be repositioned until the connections have been made and the cables placed in the desired longitudinal positions. The cable seal only then needs to be closed and the sealing and cable-anchoring pressure created with the clamp, or with the enclosure cover in the case of an arrangement parallel with the wall If cables later have to be added or replaced, it is merely necessary to open the cable-sealing part.

A simple mounting part is used for creating the outward seal on control cabinets and enclosures; this consists of a frame with which the sealing flange of the device is pressed down and two free-standing wall surfaces adjoining the side of the device. The frame can be designed for fastening with screws or with quick-mounting gripping claws. In the version with the cable outlet parallel with the wall, the parallel position of the frame part of the mounting and the cable-sealing clamp immediately suggests a version in which the frame is extended upwards to form the lower part of the enclosure and also contains the lower part of the clamp, so that the upper part of the clamp takes the form of a cover stretching out over the whole width of the enclosure.

BRIEF DESCRIPTION OF THE DRAWINGS

A more complete understanding of the invention can be obtained by reference to the accompanying drawings in which generic parts of the illustrated matter are indicated by arrowhead lines associated with the designation numerals while specific parts are with plain lines associated with the numerals and wherein:

FIG. 2 is a fragmentary, isometric view, partially sectionalized, showing a sealing device of the invention in the closed position, with the cable-sealing clamp tightened and two cables passing through it, installed in a terminal element of a carrier-arm system.

FIG. 3 is a fragmentary, isometric view, partially sectionalized, showing a sealing device of the invention in the closed position in a mounting part fitted for an external seal against control cabinets and enclosures.

DESCRIPTION OF THE PREFERRED EMBODIMENTS

Figure 1:
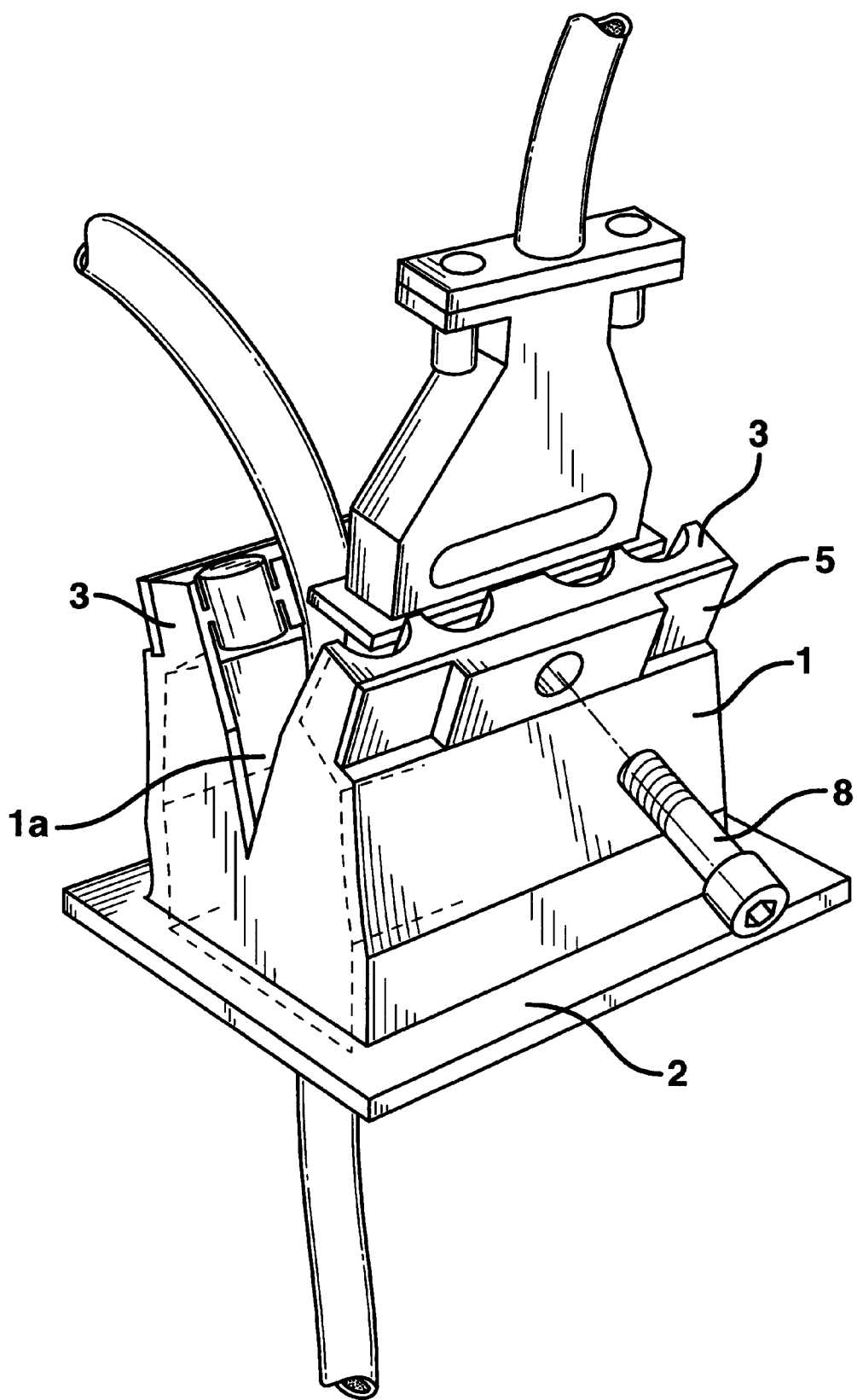
FIG. 1 is a fragmentary, isometric view showing a sealing device of the invention with the cable-sealing part splayed open, a cable running through it and a plug which has already been passed through it.
Figure 4:
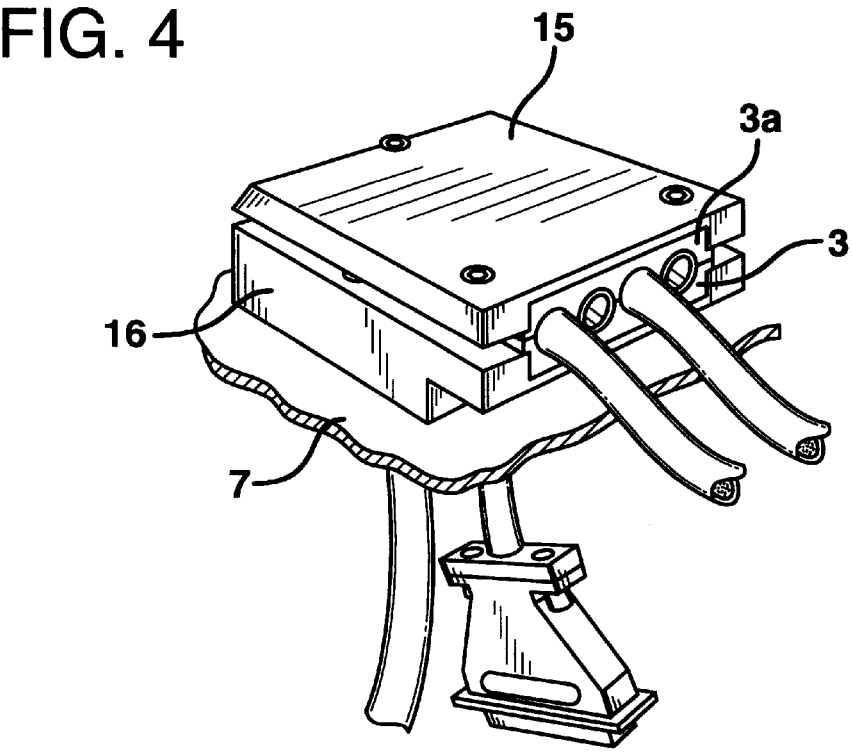
FIG. 4 is a fragmentary, isometric view, partially sectionalized, showing a sealing device of the invention adapted to allow the cable to run parallel to the wall with a mounting or an enclosure in the closed position.
Figure 4A:
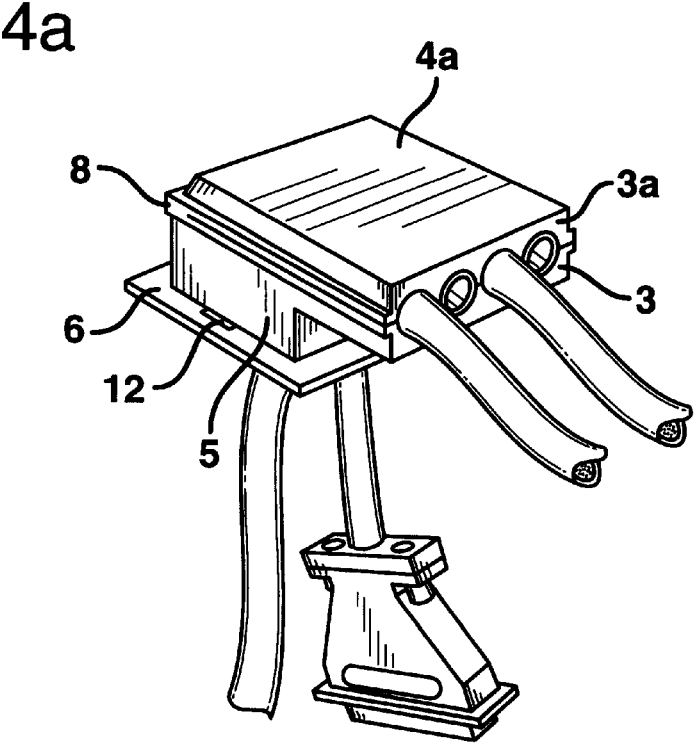
FIG. 4a is similar to FIG. 4, but shows a like device without any enclosure.
Figure 5:
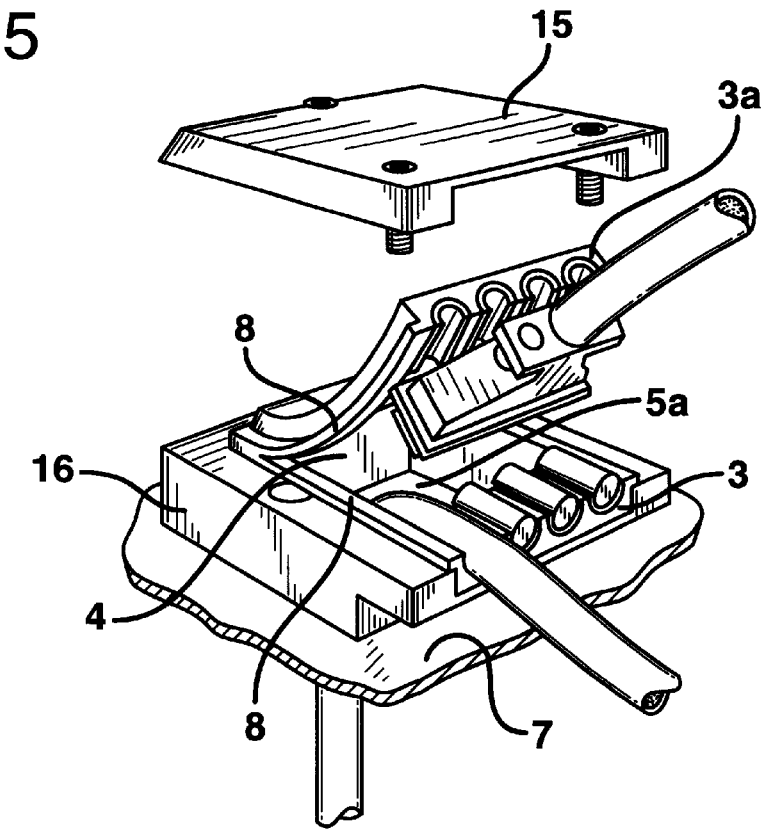
FIG. 5 is a exploded, fragmentary, isometric view, partially sectionalized, showing a device of the invention adapted to allow cable to run parallel to the wall, in the open position, with a cable already running through it and a second cable fitted with a plug running through it in an enclosure.
Figure 5A:
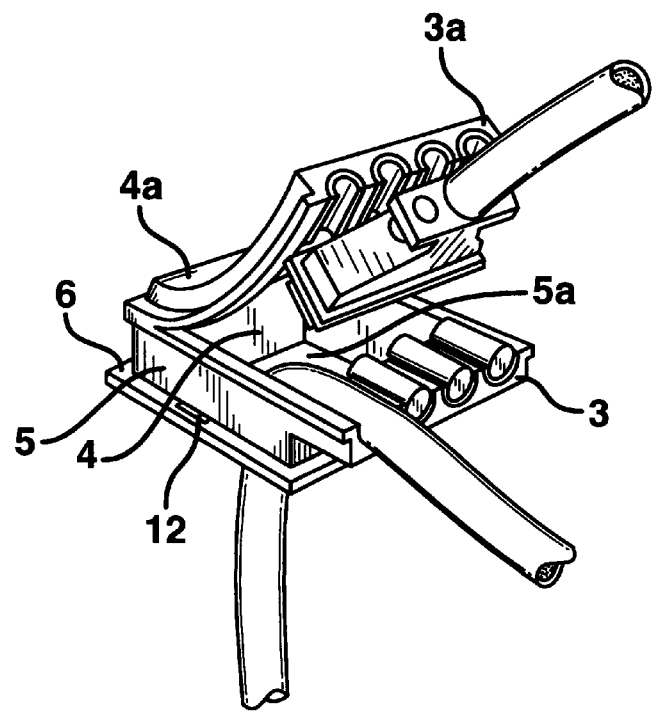
FIG. 5a is similar to FIG. 5, but shows a like device without any enclosure.

Referring in detail to the drawings, a device of the invention for the closing and sealing of cutout bushings of major diameters mainly consists of a moulded part of an elastic material which combines three functional elements together in one piece: a central part 1 with an aperture shaft 1a of rectangular cross-section on the inside wide enough for cables and plugs, a frame-like sealing flange 2 fitted to one end of the central part 1 and a cable-sealing part capable of being splayed open 3 to the other end.

The sealing flange 2 form a seal against the opening and, to this end, is pressed against the wall surrounding the opening 6 by a mounting part or, alternatively, by its screwed-on frame 4. The cable-sealing part 3 at the opposite end of the shaft-like central part form a seal against the cable opening and can be splayed open far enough to allow the cables with plugs to be passed through it and is wide enough for the envisaged number of cables.

The cable sealing device can be used in the terminal elements of a carrier-arm system, as the internal seal between the opening in the enclosure or wall and the carrier-arm (FIG. 2), or as an external seal with the aid of a simple mounting part (FIG. 1) consisting of a screwed-on frame 4 and two free-standing walls 7 covering the sides of the device and adjoining it to form a seal against the cable openings in control cabinets and enclosures. This simple mounting part can of course be extended to form an enclosure for protection or design reasons.

The device is mounted securely together with the part with which it is to be used in such a way that it covers the cable opening and forms a seal. The cable-sealing part 3 is then splayed open, and the cables and plugs brought into the shaft 1a. The plug connection is then made, and the cable positioned, then the cable-sealing part is closed and by means of a clamp 5 acting on both sides of the cable-sealing part the pressure necessary for creating a seal around the cables and against the opening in the cable-sealing part is created by means of a screw 8. The sealing effect of the opening in the sealing-part opening 9 is increased by the adjoining wall 7. The elasticity of the material is selected in such a way that the clamping pressure is great enough to fasten the cable in the longitudinal direction, which means that there is no need for an additional cable anchorage.

A cable-opening device of this kind with cable openings parallel to the wall can be achieved by transferring the cable-sealing part to the side of the shaft-like central part and by positioning the axis of the cable opening at 90° to the axis of the shaft (FIGS. 4, 4a, 5, 5a, and 7). In this arrangement, the upper half of the cable-sealing part 3a is extended above the shaft as a cover 4a and attached to the wall 4 on the opposite side of the shaft.

This arrangement of the device is shown (FIGS. 4 and 5) as an example of an external seal with an enclosure 15 and 16 which surrounds the sealing device and presses the flange seal 6 against the wall 7. It thus creates the seal pressure between the lower part 16 of the enclosure and the cover 15 for the cable seal 3, 3a and the bulge 8, and the three cover screws make a seal against the sealing-part opening.

Figure 6:
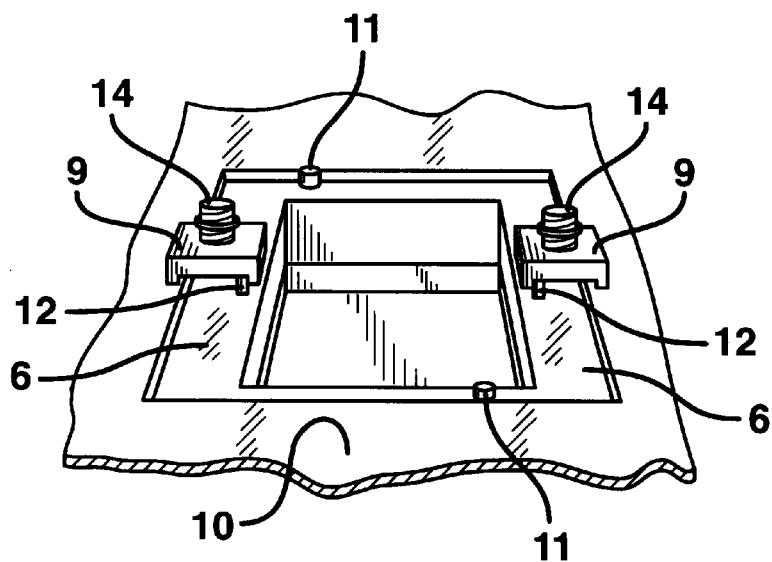
FIG. 6 is a fragmentary, isometric view, partially sectionalized, showing the device from underneath or behind the cable opening in the wall with a gripping claw quick mounting device.
Figure 6A:
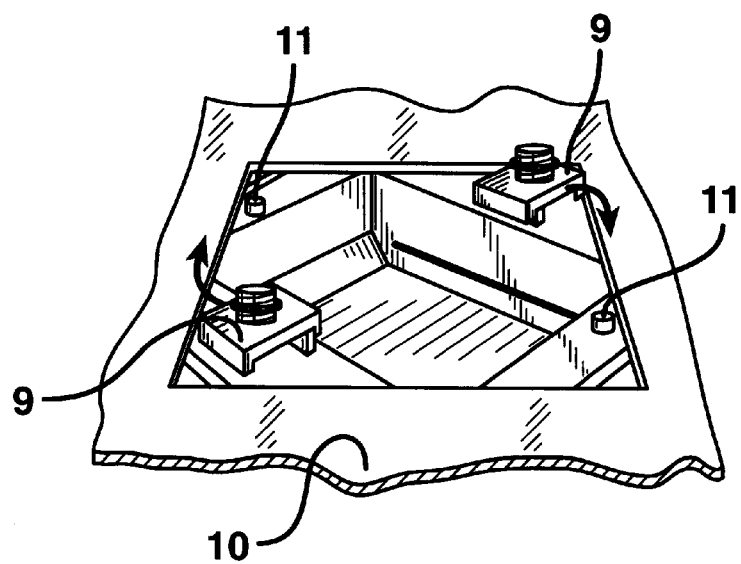
FIG. 6a is similar to FIG. 6, but shows the device from underneath or behind the cable opening in the wall and the enclosure with gripping claws in the diagonal position, in which the gripping claws are led through the opening in the wall. As the arrows indicate, the enclosure is then rotated through 45° to the position parallel with the opening, so that, as is shown in FIG. 6, the claws grip behind the wall surrounding the opening. To limit the rotation, two spigots are provided which run up against the wall with the opening.
Figure 7:
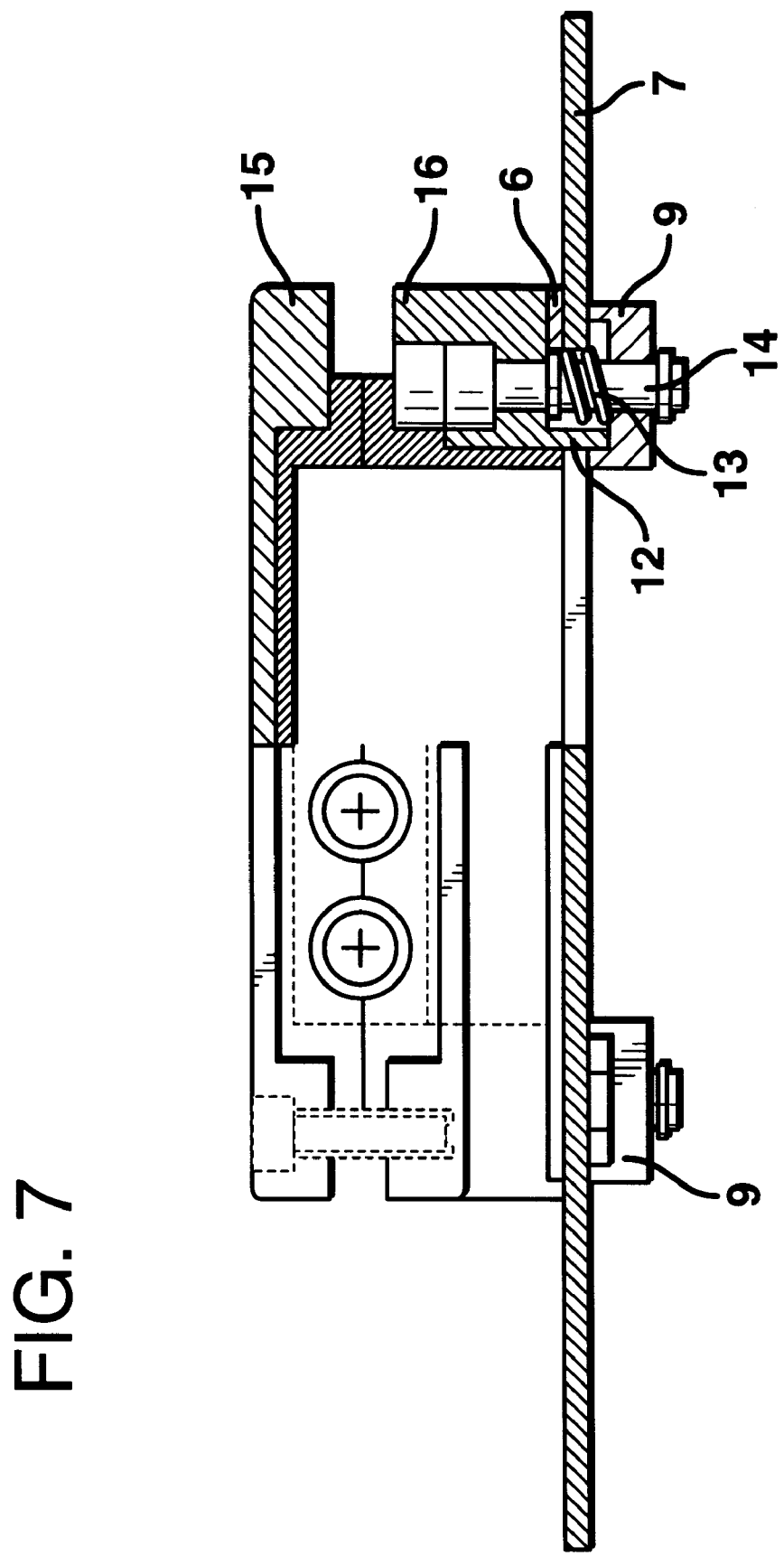
FIG. 7 is a front, partially sectionalized view showing part of a device of the invention from in front and a section of the ready mounted enclosure and the sealing device.

A particularly quick and simple way of fitting the mounting or enclosure of the device, involving rotating it through 45° and tightening two screws (FIGS. 6 and 6a) envisages the underneath side being fitted with two gripping claws (9) which can be rotated through 45° (see arrows) below and behind the wall 10 surrounding the opening after first having been led through at a diagonal angle through the opening, which in this example is square in shape.

To create a defined final position when rotating this part inwards, two spigots 11 are provided on the enclosure which project through the seal which fit against the opposite sides of the opening when the parallel position to the sides of the opening have been reached. The gripping claws are supported by cross-pieces 12 fitted to the underside of the enclosure and projecting through the seal and are held against the lower or rear metal wall with one screw 14 each, to which they are held by screwing. A spring 13 is attached to each screw between the claw and the underside of the enclosure in order to hold the claws open for the purpose of rotating the part behind the metal wall.

I claim:

1. A device for sealing and closing cable openings with a relatively large cross-sectional size, through which cables which have plugs already attached, can be led, and serving as an internal seal at the interface between an enclosure and a carrier-arm system, or as the external seal in the case of control cabinets and enclosures which comprises:

a molding constructed of elastic material, said molding having a central section, said central section having a hollowed out conduit section, said conduit section having a rectangular cross-section of sufficient length and width to allow at least one cable with a plug and several plugless cables to pass through said conduit section of said central section, a sealing flange, said sealing flange having frame-like shape, said sealing flange attached to one end of said central section, said sealing flange having sufficient length and width to protrude outward from all sides of said central section, a cable sealing part, said cable sealing part attached to said central section at the end opposite said sealing flange, said cable sealing part being split lengthwise and parallel to the direction that said cables pass through said central section such that said cable sealing part includes splayed opening, said split extending into said attached central section such that the splayed opening of said cable sealing part is of sufficient length and width as to allow said at least one cable with a plug and said several plugless cables to pass through said cable sealing part while splayed open, said cable sealing part having a row of cylindrically shaped openings, said cylindrically shaped openings extending completely through said cable sealing part, said cylindrically shaped openings being cut in half along the lengthwise axis of said cylindrically shaped openings by said split, said cylindrically shaped openings containing hollow cylinders, said hollow cylinders having an outside diameter the same size as said cylindrically shaped openings and an inside diameter which varies based on sizes of said cables, a clamp, said clamp attached to said cable sealing part, said clamp having two flat clamping pieces, said pieces having the same width as said cable sealing part, said pieces placed on opposite sides of said cable sealing part parallel to said split and connected by a tightening mechanism which when tightened creates the necessary pressure for sealing said cables in said cable sealing part.

2. A device for sealing and closing cable openings with a relatively large cross-sectional size, through which cables which have plugs already attached, can be led, and in which a cable outlet is arranged parallel to a wall, which comprises:

a molding constructed of elastic material, said molding having a central section, said central section having a hollowed out conduit section, said conduit section having a rectangular cross-section of sufficient length and width to allow at least one cable with a plug and several plugless cables to pass through said conduit section of said central section, a sealing flange, said sealing flange having a frame-like shape, said sealing flange attached to said central section, said sealing flange having sufficient length and width to protrude outward from all sides of said central section, a cable sealing part, said cable sealing part attached to a side of said central section at a 90 degree angle to the axis of said conduit section, said cable sealing part being split lengthwise and perpendicular to the direction that said cables pass through said conduit section of said central section such that said cable sealing part includes splayed opening by lifting a top section of said cable sealing part while leaving a bottom section of said cable sealing part fixed, said split extending into said attached central section such that the splayed opening of said cable sealing part is of sufficient length and width to allow said at least one cable with a plug and said several plugless cables to pass through said cable sealing part while splayed open, said cable sealing part having a row of cylindrically shaped openings, said cylindrically shaped openings extending from said conduit section to a cable outlet of said cable sealing part, said cylindrically shaped openings being cut in half along the lengthwise axis of said cylindrically shaped openings by said split, said cylindrically shaped openings containing hollow cylinders, said hollow cylinders having an outside diameter the same size as said cylindrically shaped openings and an inside diameter which varies based on sizes of said cables, said cable sealing part having protruding lips extending along and parallel to said split on both the top section and the bottom section, a cover, said cover having an upper portion and lower portion said cover having an inside shaped such that said molding fits within said cover, said protruding lips protruding out between said lower portion and said upper portion of said cover when said cover is placed around said molding, said cover having a connecting means for connecting said upper portion to said lower portion, said connecting means pressing said protruding lips together and sealing said split.

3. The device of claim 2 wherein:

said split extends completely through said central section whereby, the top section of said cable sealing part is completely detached from said molding, and the top section of said cable sealing part fits within said upper portion of said cover with said protruding lip of the top section of said cable sealing part protruding out.

4. The device of claim 3 further comprising:

mounting clamps for mounting said device to a control panel or enclosure, said mounting clamps being attached to said sealing flange.

5. The device of claim 4 wherein:

said mounting clamps are U-shaped gripping claws, said gripping claws connected to said molding by tension screws said tension screws having a spring around said screws, said spring placed between the gripping claws and the molding such that the gripping claws are held away from the molding but approaches the molding as the tension screws are turned in.

6. The device of claim 5 wherein:

said tension screws are screwed into said molding at a distance apart such that said screws abut against opposite side walls of cable openings in said control panel or enclosure when a line formed between said tension screws is parallel to the remaining two side walls of said cable openings.

7. The device of claim 6 wherein:

said claws are positioned on the molding such that said gripping claws can pass through said cable openings in said control panel or enclosure when a line formed between said gripping claws is diagonal to said cable openings, said gripping claws being able to grip said control panel or enclosure when said molding is rotated 45 degrees such that the line formed between said gripping claws becomes parallel to two opposite sides of said cable openings and said device becomes positioned for mounting on said control panel or enclosure.

8. The device of claim 7 further comprising:

said molding having two pin shaped mounting guides, said pin shaped mounting guides protruding from the portion of said molding having said sealing flange attached, said pin shaped mounting guides positioned such that when said molding is positioned for mounting on said control panel or enclosure said pin said mounting guides abut the edges of said cable openings not gripped by said gripping claws assuring proper positioning of said device.

* * * * *